March 18, 1958     J. W. CABLE ET AL     2,827,544
TUBE WELDING BY HIGH FREQUENCY RESISTANCE HEATING
Filed July 27, 1956
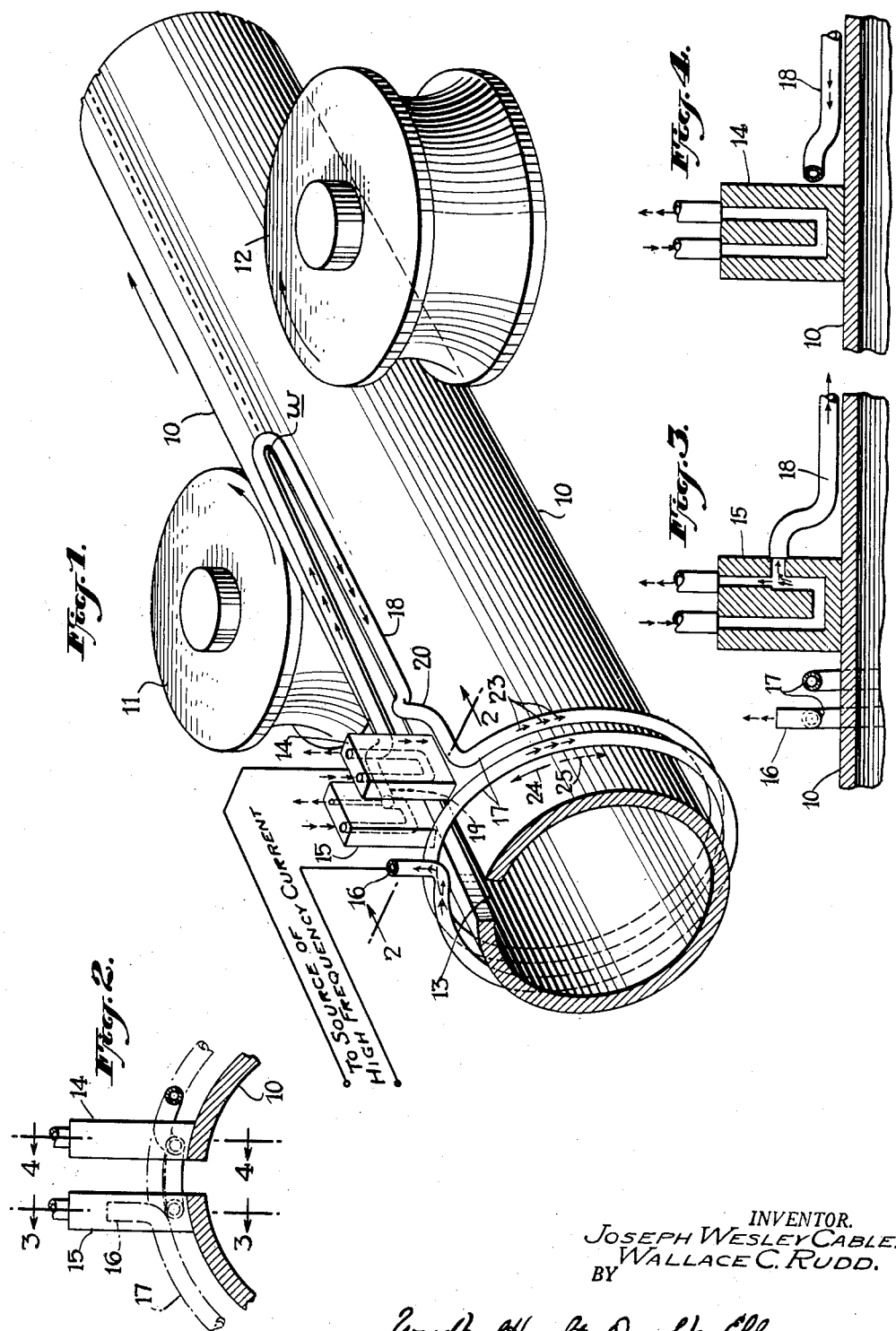
INVENTOR.
JOSEPH WESLEY CABLE.
WALLACE C. RUDD.
BY
ATTORNEYS.

United States Patent Office 2,827,544
Patented Mar. 18, 1958

2,827,544

TUBE WELDING BY HIGH FREQUENCY RESISTANCE HEATING

Joseph Wesley Cable, Monroe, Conn., and Wallace C. Rudd, Larchmont, N. Y., assignors to Magnetic Heating Corp., New Rochelle, N. Y., a corporation of New York Application July 27, 1956, Serial No. 600,606

4 Claims. (Cl. 219—67)

This invention relates to the welding of metal tubing by the use of high frequency resistance heating.

A method has heretofore been known, for example as disclosed in British patent to Magnetic Heating Corporation, No. 748,528, accepted February 23, 1956, for welding together the edges defining a gap in metal tubing, such method comprising advancing the tubing longitudinally while applying pressure thereto to close the gap at a welding point, and heating the gap edges to welding temperature at such point, such heating being effected by the application of radio frequency current by means of contacts which engage the tube metal at points on or near the opposite gap edges and at positions in advance of the welding point. The current used is of such a high frequency that the lowest impedance path between the contacts for the current in the tubing follows along the gap edges to the welding point, whereby the greater part of the current, and hence of the resistance heating effect, is concentrated at the approaching gap edges and the welding point.

While such method operates satisfactorily under many conditions, there is still some substantial tendency, more especially with small tubing of high electrical conductivity, for portions of the heating current to flow circumferentially around the back of the tubing opposite from the gap, thus wastefully heating to some degree portions of the tube metal remote from the gap and where no heating is necessary.

The present invention provides a relatively simple means and method for minimizing such wasted current flow around the back of the tubing and this is accomplished by providing a "coil" of one or preferably more turns, extending circumferentially of the tubing in closely spaced relation to the wall surfaces thereof and so connected to the source of high frequency current that it will cause a voltage to be induced in the tube metal along a path extending circumferentially around the tubing, which voltage at any given instant will be in opposition to the voltage which causes the current to flow from the above-mentioned contacts around circumferentially on the tubing. Thus the impedance of the current path from one contact around the back side of the tubing to the other contact, is increased, and as a consequence, a larger proportion of the work current tends to be concentrated along the approaching gap edges which are to be welded together.

According to the invention herein disclosed, such "coil" extending circumferentially of the tubing, is connected in series with the path of the current which heats the gap edges. In a co-pending application filed on July 20, 1956, Serial No. 599,094, by one of the present applicants, Wallace C. Rudd, such a "coil" for a similar purpose and having one or more turns, is disclosed, having its terminals connected in parallel with the part of the electric circuit which heats the gap edges.

Various further and more specific objects, features and advantages of the invention will appear from the description given below, taken in connection with the accompanying drawings, illustrating by way of example certain preferred forms of the invention.

In the drawings:

Fig. 1 comprises a somewhat schematic perspective view showing a preferred embodiment of the invention;

Fig. 2 is a broken vertical sectional view taken substantially along line 2—2 of Fig. 1; and Figs. 3 and 4 respectively are vertical sectional views taken substantially along lines 3—3 and 4—4 of Fig. 2.

As shown in Fig. 1, a tube 10 is being advanced through a tube mill by and between a pair of pressure rollers of known form as at 11 and 12, which engage the opposite sides of the tube and cause the longitudinal gap 13 therein to become closed substantially at a welding point indicated at $w$. One terminal of a source of high frequency current is connected to a contact 14 which preferably slidably engages the tube metal at or near one edge of the tube gap 13. A contact 15 is shown similarly engaging the other edge of the gap. The other terminal of the high frequency source of current is shown as connected to an end 16 of a "coil" 17. A conducting member 18 of hairpin-like configuration has one end as at 19 connected to the contact 15 and its other end merging as at 20 into the "coil" 17. This hairpin-like member extends out along above the approaching tube gap edges in closely spaced relation thereto as indicated, and serves to conduct the current from the coil 17 out along one gap edge and to the region just above the welding point and back along the other gap edge to the contact 15. This conducting member accordingly will conduct the high frequency current at any given instant in a direction such that it will induce in the opposed gap edges respectively currents in the opposite direction, viz. in the same direction on such gap edge as the current which flows in the metal of the tubing from one contact to the other. Thus the conductor 18 serves to enhance and concentrate the flow of current in the approaching gap edges.

The contacts and hairpin-like conductor are substantially like those disclosed in the above-mentioned British patent, reference to which is hereby made as to further details of operation and possible modifications thereof. It will be understood that, if desired, the hairpin-like turn 18 may be omitted, in which case the terminals of the source of high frequency respectively would be connected respectively directly to contact 14 and to the end 16 of coil 17, the other end of which coil would be connected directly to contact 15.

As disclosed in said British patent, the contacts and all conductor parts carrying the high frequency current are preferably fluid-cooled, and to that end cavities are provided in the contacts 14 and 15 for receiving streams of cooling fluid flowing in the direction indicated by the double arrows. The stream which flows through member 15, or a part thereof, may also flow through the hairpin-like turn 18 and coil 17 which are made in the form of hollow tubing.

It will be noted that "coil" 17, which may include one or more turns in the form of fluid-cooled tubing as indicated, extends circumferentially around and in closely spaced relation to the tubing, including the "back" portions thereof opposite from the gap.

The apparatus shown in the drawings will operate in a manner similar to the operation of the equipment shown in said British patent, except that here the current from connection 16 will flow around through the "coil" 17 back to and through the conductor 18, this current flow being electrically in series with the current flow from the contacts along the gap edges to and from the weld point. The relative directions of the flow of the current at a given instant are indicated on several of the parts in the drawings by groups of three short arrows. Assuming for example as indicated, that at a given moment current is flowing down into contact 14, it will continue from that contact outwardy along a tube gap edge and around the weld point and back along the other gap edge to the contact 15. Thence from contact 15, the current will be conducted through conductor 18 out and back, and then to and through "coil" 17 to terminal 16. It will be apparent that while the current is flowing in a downward direction, for example as indicated by the short arrows at 23 in Fig. 1, it will cause a voltage to be induced in the wall of the tubing 10 in the direction indicated by the longer arrow 24. This induced voltage, however, will be in opposition to the voltage which causes current to flow around through the back of the tubing from one of the contacts 14, 15 to the other in the direction indicated by the dotted arrow 25. Thus in effect this circumferential current path in the tubing will have its impedance increased by the presence of the coil 17, with the result that the greater portion of the radio frequency energy used will be caused to be more concentrated to flow from the contacts along the gap edges to and from the weld point and less current will be wasted in heating the tube metal at other regions.

The connection of the coil 17 in series with the source of current to the contacts 14, 15, provides a convenient way in which the desired current in this coil may be maintained of such frequency and phase relationship with respect to the current supply to the contacts as to insure that the coil will tend to induce a voltage in the tubing opposed to the voltage which causes current to be conducted from one contact circumferentially in the tubing to the other contact. However, it will be understood that other ways of supplying the coil 17 with appropriate current for this purpose are possible in addition to the parallel circuit arrangement disclosed in the above-mentioned co-pending application of Wallace C. Rudd.

As will be noted in said British patent, the contacts similar to those here shown at 14, 15 may alternatively be so mounted as to engage the edge faces in the tube gap 13, or even, if desired, the inner surface of the tube metal adjacent the gap.

The invention is particularly well adapted for use in the welding of relatively small tubing or tubing having an internal diameter of small dimensions, wherein it would be difficult to mount means of other known types for increasing the reactance in a circumferential current path around the back of the tubing.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding together the edges of a longitudinal gap in metal tubing which comprises: longitudinally advancing the tubing while subjecting the same to pressure from opposite sides thereof to bring the gap edges together at a welding point and while heating said edges to welding temperature by applying contacts connected to a source of high frequency current, to points on the tubing at opposite sides of the gap at a position shortly in advance of said point, a low impedance path for such high frequency current being provided from the contacts along the approaching gap edges to and from said welding point and the resulting resistance heating being concentrated along such edges and acting to continue to increase the temperature thereof as same approach the welding point; and providing a "coil" connected in series with the circuit of said contacts and extending circumferentially of the tubing in closely spaced relation to surfaces thereof, whereby the high frequency current will flow through said "coil" and induce a voltage circumferentially in the tubing opposing the voltage which causes current to be conducted from one contact circumferentially of the tubing around to the other contact.

2. Apparatus for welding together the edges defining a longitudinal gap in metal tubing, such apparatus comprising: means for longitudinally advancing the tubing past means for applying pressure thereto to close said gap at a welding point; a pair of contacts mounted to engage the tubing respectively adjacent the gap edges and at positions shortly in advance of said welding point; means for applying a radio frequency current to said contacts whereby such current flows from the contacts along the gap edges to and from the welding point and the resistance heating effect of such current is concentrated in the approaching gap edges; a "coil" extending circumferentially of the tubing in closely spaced relation to surfaces thereof; and means for applying a radio frequency current to said "coil" having such frequency and phase relationship to the current applied to said contacts as to induce a voltage circumferentially in the tubing opposing the voltage which causes current to be conducted from one contact circumferentially of the tubing around to the other contact.

3. Apparatus for welding together the edges defining a longitudinal gap in metal tubing, such apparatus comprising: means for longitudinally advancing the tubing past means for applying pressure thereto to close said gap at a welding point; a pair of contacts mounted to engage the tubing respectively adjacent the gap edges and at positions shortly in advance of said welding point; means for applying a radio frequency current to said contacts whereby such currents flows from the contacts along the gap edges to and from the welding point and the resistance heating effect of such current is concentrated in the approaching gap edges; and a "coil" extending circumferentially of the tubing in closely spaced relation to surfaces thereof, said coil being connected in series with the radio frequency curent circuit of said contacts whereby such frequency current will flow through said coil and induce a voltage circumferentially in the tubing opposing the voltage which tends to cause current to be conducted from one contact circumferentially of the tubing around to the other contact.

4. Apparatus in accordance with the foregoing claim 3 and in which said coil is mounted in a position to extend circumferentially around outside the tubing.

References Cited in the file of this patent
UNITED STATES PATENTS

| 2,020,276 | Crawford | Nov. 5, 1935 |
| 2,139,211 | Sessions | Dec. 6, 1938 |

FOREIGN PATENTS

| 716,378 | Great Britain | Oct. 6, 1954 |
| 1,095,095 | France | Dec. 15, 1954 |